Oct. 8, 1929.  E. MORTERUD  1,731,146
APPARATUS FOR THE EVAPORATION OF LIQUIDS
Filed Dec. 13, 1926

INVENTOR
Einar Morterud
by Langner, Parry, Card & Langner
Attys.

Patented Oct. 8, 1929

1,731,146

UNITED STATES PATENT OFFICE

EINAR MORTERUD, OF TORDEROD, NEAR MOSS, NORWAY

APPARATUS FOR THE EVAPORATION OF LIQUIDS

Application filed December 13, 1926, Serial No. 154,614, and in Norway December 19, 1925.

The present invention has for its object an apparatus for evaporation of liquid of the kind which comprises a number of superposed shallow vessels or troughs which all communicate with a common outlet.

The characteristic feature of the present invention lies therein that the heating of the liquid takes place by means of heating elements which extend vertically through all troughs or vessels.

The heating elements preferably consist in a number of vertical steam heated tubes and further the liquid carrying troughs according to another feature of the invention are adapted to be reciprocated in a vertical direction along the steam heated tubes and the several troughs or vessels are provided with scrapers adapted to keep the heating surface clean.

The openings in the troughs through which the steam heated tubes pass have a diameter which is somewhat larger than the tubes and the annular space between the exterior circumference of the tubes and the inner circumference of the holes is partly covered by loose discs which rest on the bottom of the troughs and the inner circumference of which is provided with small guiding knobs or tongues which extend close to the exterior circumference of the heating tubes.

Figure 2:
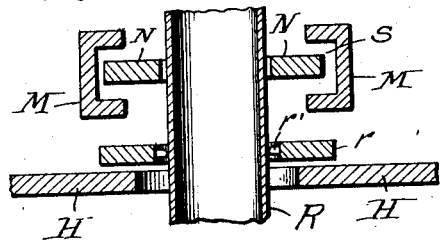
Figure 3:
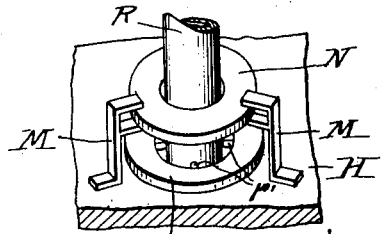
Figure 1:
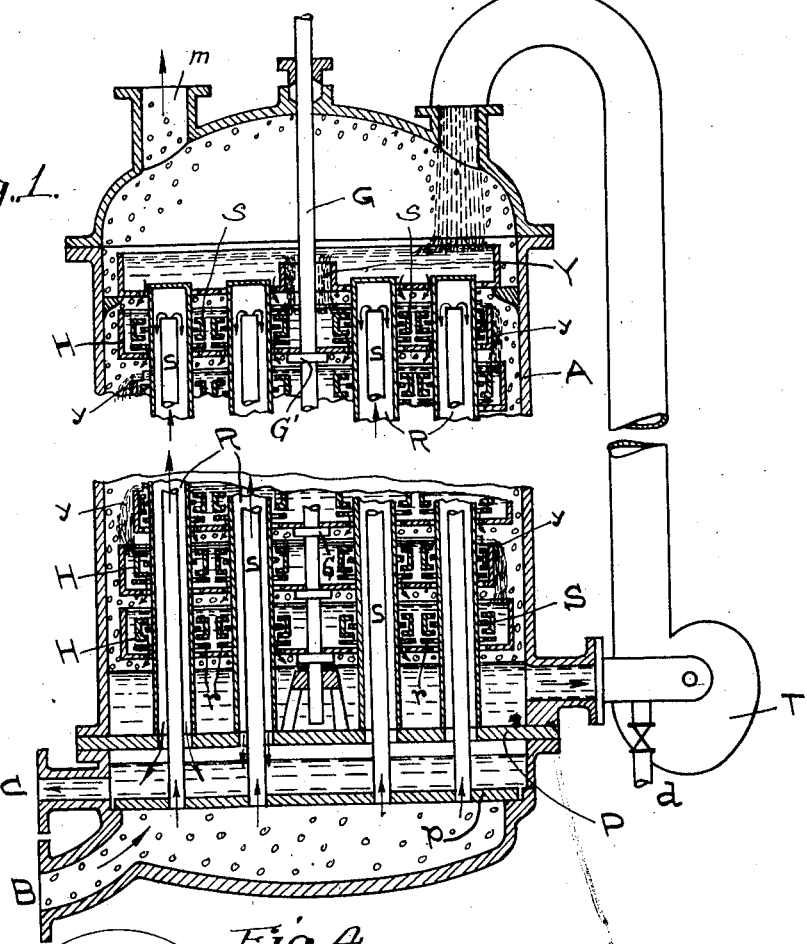
Figure 4:
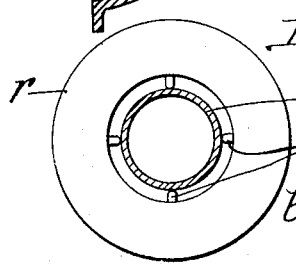

In the accompanying drawings: Figure 1 is a vertical sectional view through the apparatus embodying the invention; Figure 2 is a vertical sectional view through one of the units; Figure 3 is a perspective view of one of said units; and, Figure 4 is a horizontal sectional view illustrating, in detail, a portion of the apparatus.

The heating, according to this form of the invention, takes place by means of steam which is introduced through inlet tube B, passes upwards through the inner tubes $s$ which are fastened to the bottom plate $p$ and flows down again through exterior heating tubes R, which are fastened to the second bottom plate P. C is the outlet opening for condensed steam.

The several compartments of the apparatus are formed by shallow troughs H, which are mounted on a central shaft G, adapted to be reciprocated in the axial direction. Each trough H rests at its center on a collar G' secured to the shaft G. The shaft G in its upward movement raises the troughs and then on its downward movement permits the troughs to descend by gravity. The several troughs do not extend right out to the shell A and the liquid in each trough accordingly is in communication with the steam outlet $m$ through the annular space between the troughs and the inner wall of shell A.

The liquid to be evaporated is introduced at $c$ and by means of centrifugal pump T is continually circulated through the apparatus. The liquid introduced into the top trough passes downwards through the several troughs by means of the annular openings surrounding the heating tubes and superflous liquid passes downwards either through the central opening Y as shown on top trough, or through the side overfall $y$ as shown on the second trough. Condensed liquid is taken out at the bottom through outlet tube $d$.

As shown on the lowermost trough annular discs $r$ with radial guiding knobs $r'$ may be placed on the bottom of the troughs surrounding each heating tube to act as valves and also each trough may be provided with a scraper arrangement S adapted to keep the exterior surface of the heating tubes clean when the troughs are reciprocated in the vertical direction by means of central carrying shaft G.

On the upward movement of the shaft G the various troughs H in being moved upwardly cause the small disks —$r$— to seat more or less firmly against the bottom of the respective troughs. These disks —$r$— therefore, restrict the size of the openings through which the liquid passes in the bottom of the troughs H. The openings cannot be made to fit closely around the heating tubes, for to do so might cause jamming in case the tubes are not quite straight. Each scraper arrangement S comprises members —M— having a channel-shaped cross-section secured to the trough and an annular member —N— surrounding the heating element. In the up and down movement of the troughs the members —M— cause the corresponding reciprocal movement of the annular members —N— up and down the heating elements to scrape the same and maintain the outer surface thereof clean.

Claims:

1. In an apparatus for the evaporation of liquids an evaporating vessel, a number of shallow superposed evaporating troughs therein, means for imparting a reciprocating movement in the vertical direction to the said superposed evaporating troughs by raising them and permitting them to descend by gravity, a stationary heating element extending vertically through the several troughs, and means associated with the heating element and the troughs for keeping clean the surface of the element by the reciprocating movement of the troughs.

2. In an apparatus for the evaporation of liquids an evaporating vessel, a number of shallow superposed evaporating troughs therein, means for imparting a reciprocating movement in the vertical direction to the said superposed evaporating troughs, a stationary heating element extending vertically through the several troughs, scrapers loosely mounted on the heating element for keeping the exterior surface of the vertical heating element clean, and means on the troughs for operating the scrapers when the troughs are reciprocated.

3. In an apparatus for the evaporation of liquid, an evaporation vessel, a plurality of shallow relatively spaced liquid troughs supported therein, each trough having an opening therein, a steam outlet from the evaporating vessel, and a heating element extending vertically through the openings in the several evaporating troughs in the said vessel and common to all of said troughs; the openings of the troughs being of greater diameter than the heating element to provide for passage of the liquid from each of said troughs to the surface of the heating element and over said surface to the trough below the first mentioned trough.

4. In an apparatus for the evaporation of liquid, an evaporation vessel, a plurality of shallow relatively spaced liquid troughs supported therein, one above another, each trough having an opening therein, and a steam heated evaporating means extending vertically through the several evaporating troughs through the opening therein, the openings in the troughs being of greater diameter than the heating means to provide for passage of the liquid from each trough to the surface of the said means and from said surface to the trough next beneath.

In testimony whereof I have signed my name to this specification.

EINAR MORTERUD.